United States Patent
Klinger

[15] 3,696,663
[45] Oct. 10, 1972

[54] FORCE APPLYING APPARATUS

[72] Inventor: Friedrich Klinger, Darmstadt-Arheilgen, Germany

[73] Assignee: Carl Schenck Maschinenfabrik GmbH, Darmstadt, Germany

[22] Filed: Feb. 18, 1971

[21] Appl. No.: 116,529

[30] Foreign Application Priority Data

Sept. 30, 1970    Germany..........P 20 48 050.6

[52] U.S. Cl.........................................73/91, 73/100
[51] Int. Cl................................................G01n 3/00
[58] Field of Search....73/88 R, 91, 92, 93, 100, 118, 73/67.3, 71.7

[56] References Cited

OTHER PUBLICATIONS

" Random Load Fatigue Test on Automotive Components & Structure" by J. D. Camp, ASTM-STP, 476, presented in June 1969

Primary Examiner—James J. Gill
Assistant Examiner—Marvin Smollar
Attorney—W. G. Fasse

[57] ABSTRACT

The present apparatus is used for applying forces substantially to a point of a structural member, for example, for testing an axle of a motor vehicle by simulated forces corresponding to those applied to the member when it is in actual use. This is accomplished by push rods and force delivering means, such as piston cylinder means. The rods and piston cylinder means are interconnected by yokes in such a way that forces may be applied independently or in various combinations in the three spatial directions, to said point of the structural member.

10 Claims, 3 Drawing Figures

PATENTED OCT 10 1972

3,696,663

INVENTOR
FRIEDRICH KLINGER

BY Co. G. Fosse

ATTORNEY 3,696,663

FORCE APPLYING APPARATUS

BACKGROUND OF THE INVENTION

The present invention relates to an apparatus for applying forces substantially to a point of a structural member in these spatial directions, whereby the forces are variable. The forces may also be referred to in terms of deformations applied to the structural member by means of three force delivering means such as hydraulic cylinders which deliver the forces in three directions independently of each other, for example, by means of push rods. The apparatus is especially suitable for use in testing equipment, particularly for testing structural members under simulated conditions which correspond to those of the actual use of such members which are subject to superimposed variable forces in all three dimensional directions such as vehicles, or more specifically, vehicular axles.

For testing motor vehicles or motor vehicle parts, especially motor vehicle axles, it is desirable to simulate the stress and strain conditions on the testing stand as truly and as genuinely as possible in order to recreate the actual operating conditions as they occur in the practical or actual operation of the vehicle in order to ascertain the behavior of the material and the influences or the characteristics of the structure being tested, especially under durability test conditions for ascertaining said behavior and influences for a long-time operation.

In connection with motor vehicles, the loads which are transferred by the wheel to the axle are essentially effective in three spatial directions. Thus, the shocks resulting from the profile of the road surface are effective substantially in a vertical direction, for example, when the vehicle passes over an undulation in the road surface. Other forces are effective in parallel to the direction of travel, that is, they are effective essentially in the horizontal direction. These forces are caused, for example, by the friction between the wheels and the road or by the air resistance or drag as well as by the braking or by the acceleration. Further forces are effective across the direction of travel, for example, the centrifugal forces resulting when the vehicle negotiates a curve or lateral shocks which occur when the vehicle travels over or against a curbstone are effective in a lateral direction perpendicularly to the direction of travel.

For simulating the above stress or load conditions in a testing stand in which the forces are applied to the vehicle or rather to the vehicle axle by means of hydraulic piston cylinder arrangements it is necessary to provide three such piston cylinder arrangements which are effective independently in three different directions.

Heretofore, an apparatus of the above type has been proposed in which the hydraulic cylinders have been arranged separately of each other in the three spatial directions about the vehicle axle to be tested. These devices have the disadvantage that the testing stand requires a very large space due to the just mentioned type of construction. A further disadvantage is seen in that the push or piston rods of the hydraulic piston cylinder arrangement have a limited length. As a result of the force applied by one of the cylinders to the vehicle axle presently being tested, such axle is displaced in space to a point other than that occupied by the axle prior to the application of a load to the axle. Such displacement changes the forces which are applied to the vehicle axle by the two other piston cylinder arrangements. Accordingly, it is necessary to ascertain the forces or rather the changes in the forces which result due to the spatial displacement of the vehicle axle being tested in order to correctly apply predetermined loads to the axle. Such changes must be ascertained by computation and the changes must be taken into account for applying the testing forces. Thus, it will be appreciated that such devices require a large investment in electronic equipment in addition to the testing equipment proper.

It has also been suggested, to combine the three hydraulic piston cylinder arrangements in a compact unit in such a manner that a member of a sliding joint or coupling is rigidly connected with one of the three hydraulic cylinders, whereby said one member may be displaced in space in its longitudinal direction. The two other hydraulic piston cylinder means are arranged in such a manner that they are capable of displacing the other member of said sliding joint or coupling in different lateral directions. A drawback of this conventional apparatus is seen in that the necessary shifting joints or couplings are rather complicated and involved as well as expensive.

OBJECTS OF THE INVENTION

In view of the foregoing, the invention aims at achieving the following objects, singly or in combination:

to overcome the outlined drawbacks;

to provide an apparatus capable of applying forces or deformations to a point from three different spatial directions, whereby such forces or deformations are to be applied independently or singly as well as in various combinations;

to provide a testing apparatus of compact construction for testing structural members under simulated operating conditions which are very much alike to the stress and load conditions under which such structural members will be operated in actual use, especially vehicle axles, aircraft parts, and any structural members which in their actual use are subject to superimposed forces;

to provide a durability testing apparatus for structural members which will permit maintaining the structural member being tested in the same position throughout the testing operation;

to avoid expensive and complicated slidable joints or slidable coupling means; and to arrange the necessary force delivering means and push rods in such a manner relative to each other that a compact structure will result which requires substantially less space than heretofore.

SUMMARY OF THE INVENTION

According to the invention there is provided a force applying apparatus, especially for testing structural members such as vehicular axles, wherein one push rod of a piston cylinder arrangement carries a forked yoke which in turn carries in its forked ends a second push rod of a second piston cylinder arrangement. A third push rod of a third piston cylinder arrangement is supported in a further yoke, whereby the second and third push rods are interconnected with each other at an angle and the further yoke is connected with the structural member to which the forces are to be applied. The elements are so supported that a point of intersection between the second and third push rod is displaceable relative to the two yokes.

Preferably, hydraulic piston cylinder arrangements are employed in accordance with the present invention.

BRIEF FIGURE DESCRIPTION

In order that the invention may be clearly understood, it will now be described, by way of example, with reference to the accompanying drawings, wherein.

Figure 1:
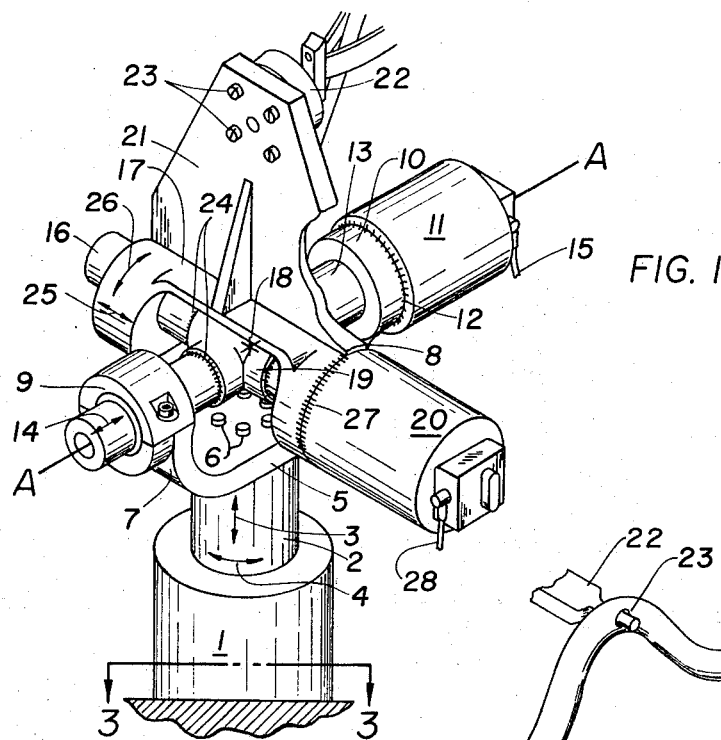
FIG. 1 is a perspective view of one embodiment of the present invention illustrating its generic concept.
Figure 2:
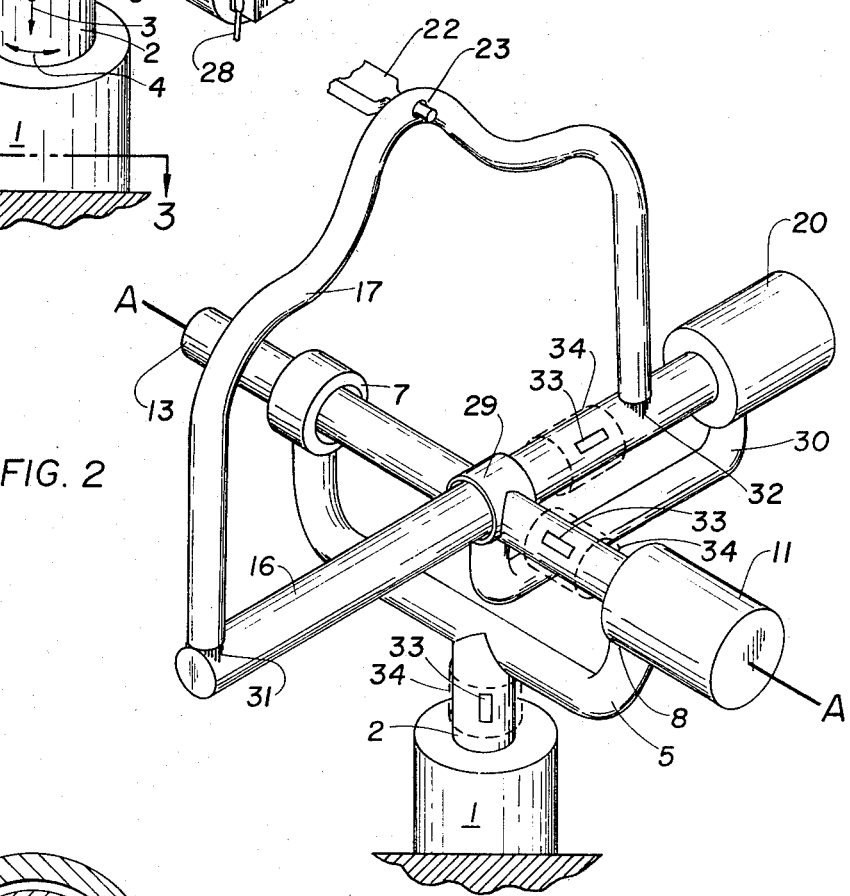
FIG. 2 is a diagrammatic perspective view similar to that of FIG. 1 but illustrating a modified embodiment of the present invention.

DETAILED DESCRIPTION OF EXAMPLE EMBODIMENTS OF THE INVENTION:

FIG. 1 shows a first force delivering means such as a piston cylinder arrangement 1 which is supported in a frame or foundation structure symbolically shown in FIGS. 1 and 2 and forming a force reaction point. A push rod or piston 2 is movable by the piston cylinder arrangement 1 vertically up and down as indicated by the arrow 3. The push rod 2 is also rotatable as indicated by the arrow 4 and as will be explained in somewhat more detail with reference to FIG. 3.

To the upper or outer end of the push rod 2 there is rigidly attached an intermediate yoke 5, for example by screws 6. The intermediate yoke 5 has forked ends 7 and 8 carrying bearings 9 and 10 respectively. A second force delivering means, such as a piston cylinder arrangement 11 is rigidly connected to one end 8 of the yoke 5, for example, by a weldment 12. The second piston cylinder arrangement 11 actuates a second push rod 13 which is supported for axial movement in the bearings 9 and 10 as indicated by the arrow 14. As mentioned, the second push rod 13 is movable back and forth along the axis AA. For this purpose, the piston cylinder arrangement 11 is connected through a conduit 15 to a source of hydraulic power not shown.

A third push rod 16 is supported in a power applying yoke 17 in such a manner that the second push rod 13 and the third push rod 16 form a point of intersection 18. Accordingly, the push rods are arranged so that they cross each other at an angle, preferably at an angle of 90°. Means 19 are provided for interconnecting the push rods 16 and 13. Such interconnecting means will be described in more detail below.

A third force delivering means, such as a piston cylinder arrangement 20 is provided for axially moving either the push rod 16 or the force applying yoke 17 together with its force transmitting member 21 which is rigidly connected to the yoke 17 on the one hand and which is releasably connected to the structural member 22, for example, in the form of a vehicle wheel, by means of bolts 23 and nuts not shown.

In the embodiment of FIG. 1 the second push rod 13 and the third push rod 16 are rigidly connected to each other by the connection means 19 which may be a cross bushing into which the push rods are inserted with a press fit. It is also possible to interconnect the push rods with the cross bushing and weldments 24. The force delivering yoke 17 is supported at both ends on the third push rod 16 by bearings similar to bearings 9, 10 mentioned above, for axial movement as indicated by the arrow 25 as well as for rotational movement as indicated by the arrow 26. Also in this embodiment the third hydraulic drive means 20 are rigidly connected to one end of the yoke 17 as by a weldment 27 so that the yoke 17 and drive means 20 move in unison relative to the push rod 16. Such movement is accomplished by the supply of a fluid under pressure through a conduit 28 as, per se, is well known in the art. Incidentally, the first piston cylinder arrangement 1 is also connected to a source of pressure.

In view of the foregoing, it will be appreciated that a vertical force is applied to the structural member 22 by moving the first push rod 2 up and down, whereby the force is transmitted through the yoke 5 to the second push rod 13 from there to the third push rod 16 and from there to the yoke 17 and transmittal member 21 to the structural member 22. A force in a first lateral direction is applied through the push rod 13 and the push rod 16, whereas a further force in a lateral direction is applied by moving the yoke 17 relative to the push rod 16 which is fixed to the push rod 13.

FIG. 2 illustrates a slightly modified embodiment as compared to FIG. 1. However, the same elements are identified by the same reference numerals so that their repeated description is not necessary. The axis AA has been rotated to simplify the illustration. In this embodiment the second push rod 13 is still supported in the forked ends 7 and 8 of the intermediate yoke 5 or in the ends 7 and in the piston cylinder arrangement 11 if the latter is considered to form a structural unit with the end 8 of the yoke 5. However, the push rod 13 is provided with a sleeve or bushing 29 located approximately intermediate the supporting means for the push rod 13. The bushing 29 is rigidly connected to the third piston cylinder arrangement 20, for example, by a rigid rod 30. Rather than driving the yoke 17 as in FIG. 1, the piston cylinder arrangement 20 now drives the push rod 16 which is freely movable in its axial direction through the bushing 29 and since the ends of the yoke 17 are now rigidly connected to the push rod 16, for example, by weldments 31 and 32, the movement of the push rod 16 is transmitted through the yoke 17 to the structural member 22.

In order to control the power or pressure supply to the piston cylinder arrangements 1, 11, and 20 there are provided according to the invention force or deformation sensing means which may be provided in the form of distance measuring strips 33 glued to the push rods 2, 13, and 16 as indicated and covered by a protective sleeve 34 as shown. These sensing strips function on the basis of the fact that a push rod will be slightly elongated or slightly upset. Such elongation or upsetting will be registered or measured by these so called expansion strips. Since the length of the expansion strip is known and since the elasticity coefficient of the push rods is given, simple conclusions can be made with regard to the force transmitted by the push rod or through the push rod. Such expansion strips for ascertaining transmitted forces are well known in the art as well as electronic circuitry responsive to such expansion strips for control purposes.

The expansion sensing strips may be replaced by distance measuring elements operating on the basis of measuring a resistance, a capacitance, or an inductance variation. These distance measuring devices are also well known in the art.

Figure 3:
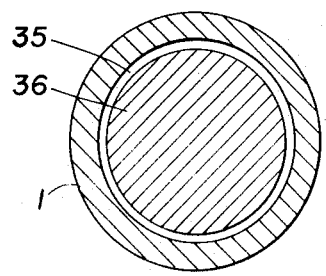
FIG. 3 is a sectional view along line 3—3 in FIG. 1.

FIG. 3 simply illustrates that there is a loose fit 35 between the cylinder housing 1 and the piston 36 so as to permit rotational movement of the respective piston rod 2. This applies also with regard to the other piston cylinder arrangements 11 and 20.

Making the push rods, especially the push rods 2 and 16 rotatable together with their respective yokes 5 and 17, relative to the respective cylinders has the further advantage that the structural member may be rotated during the testing. This may become necessary, for example, when the front axle of a motor vehicle is to be tested because the front axle is, in addition to the above mentioned forces, also subject to rotational forces which result due to the steering of the motor vehicle. Providing this special testing feature according to the invention constitutes a substantial advance in the art.

Although specific embodiments have been described, it is to be understood that the invention comprises all modifications and equivalents within the scope within the appended claims.

What I claim is:

1. An apparatus for applying forces substantially to a point of a structural member, said forces being variable in three spatial directions comprising a force reaction point, a first push rod connected to said force reaction point, first force delivering means operatively connected to said first push rod for moving the first push rod, an intermediate yoke rigidly attached to said first push rod, first bearing means carried by said intermediate yoke, a second push rod supported in the first bearing means, second force delivering means operatively connected to said second push rod for moving the second push rod, a third push rod, a third force delivering means operatively connected to said third push rod, a force applying yoke, second bearing means carried by the force applying yoke, said third push rod being supported in said second bearing means, means for interconnecting the second and third push rods with each other at an angle to form a point of intersection between the second and third push rods, whereby said point of intersection is movable relative to said intermediate yoke, and said force applying yoke is movable relative to said point of intersection, and means for connecting the force applying yoke to said structural member.

2. The apparatus according to claim 1, wherein said means for interconnecting the second and third push rods comprise cross connection means for rigidly interconnecting the second and third push rods, said apparatus further comprising means for rigidly interconnecting the third force delivering means and the force delivering yoke, and means for axially displacing the third force delivering means relative to the third push rod.

3. The apparatus according to claim 1, further comprising means for rigidly interconnecting the force delivering yoke with said third push rod, sleeve means rigidly connected to the second push rod and arranged to receive the third push rod in said sleeve means, whereby the third push rod is movable axially in said sleeve, and means for rigidly connecting said sleeve means to the third force delivering means.

4. The apparatus according to claim 3, wherein said sleeve means are located approximately intermediate said first bearing means carried by said intermediate yoke.

5. The apparatus according to claim 1, further comprising force sensing means located in suitable positions in said apparatus for measuring the forces delivered to said structural member.

6. The apparatus according to claim 1, further comprising deformation sensing means located in suitable positions in said apparatus for measuring deformations resulting from said forces.

7. The apparatus according to claim 1, wherein said push rods are piston rods and said force delivering means are piston cylinder means.

8. The apparatus according to claim 7, wherein said force delivering means are hydraulic piston cylinder means.

9. The apparatus to claim 7, wherein said force delivering means are pneumatic force delivering means.

10. The apparatus according to claim 1, wherein the structural member is a part of a craft, especially a motor vehicle.

* * * * *